United States Patent [19]
Stemmler

[11] Patent Number: 6,054,942
[45] Date of Patent: *Apr. 25, 2000

[54] SYSTEM AND METHOD FOR SCALEABLE ENCODING AND DECODING OF VARIABLE BIT FRAMES

[75] Inventor: Brian Stemmler, Ottawa, Canada

[73] Assignee: Cisco Technology, Inc., San Jose, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/911,170

[22] Filed: Aug. 14, 1997

[51] Int. Cl.[7] .............................. H03M 7/00; H04J 3/00
[52] U.S. Cl. ............................. 341/58; 341/100; 370/476
[58] Field of Search .................................. 370/476, 505, 370/506, 507; 341/58, 100

[56] References Cited

U.S. PATENT DOCUMENTS

| | | | |
|---|---|---|---|
| 4,516,201 | 5/1985 | Warren et al. | 364/200 |
| 4,675,652 | 6/1987 | Machado | 340/347 |
| 5,428,611 | 6/1995 | Jain et al. | 370/476 |
| 5,517,533 | 5/1996 | Sznauz et al. | 370/505 |
| 5,541,930 | 7/1996 | Klingman | 370/476 |
| 5,583,500 | 12/1996 | Allen et al. | 341/107 |

FOREIGN PATENT DOCUMENTS

| | | | |
|---|---|---|---|
| 0 346 555 A1 | 12/1989 | European Pat. Off. | H04L 11/00 |
| 6-268709 | 9/1994 | Japan . | |

OTHER PUBLICATIONS

William Stallings, Data and Computer Communications, 5th Edition, Prentice Hall, 1997,copyright 1997, pp. 216–218.

Anonymous, Parallel Architecture for High Speed Bit Stuffing and Byte Alignment, IBM Technical Disclosure Bulletin vol. 32, No. 6B Nov. 1989 pp. 31–34.

*Primary Examiner*—Howard L. Williams
*Attorney, Agent, or Firm*—Cesari and McKenna

[57] ABSTRACT

A method and system for parallel encoding of data for bit-stuffed HDLC compatible transmission is presented. The method analyses a byte in parallel with four recirculated previously encoded bits during each clock cycle. The recirculated bits allow for correct analysis of the presence of a fifth consecutive one within the byte including the first four bits thereof. The encoded byte is provided to a FIFO and, when 8 bits are stored therein, the eight most significant bits are extracted from the FIFO for transmission via a digital or analogue network. The FIFO provides two bytes without receiving an intervening encoded data byte when a risk of an overflow exists.

19 Claims, 5 Drawing Sheets

SYSTEM AND METHOD FOR SCALEABLE ENCODING AND DECODING OF VARIABLE BIT FRAMES

FIELD OF THE INVENTION

This invention relates generally to digital communications and more particularly to a method of encoding and decoding data for a digital communication system.

BACKGROUND OF THE INVENTION

In transmitting HDLC encoded information a variable number of data bits are transmitted between two delimiting flags—one at the beginning and one at the end. The flags and the data therebetween form a data frame. Unfortunately, a flag byte is transmitted as a series of bits which are possibly contained within the data. As such, data encoding—bit stuffing—is used to eliminate any occurrences of a flag bit sequence from within the data.

For example, a flag of 6 consecutive '1' bits preceded by a '0' bit and followed by a '0' bit indicates a frame beginning and a frame ending. During data transmission, when five consecutive '1' bits occur, a '0' bit is inserted after the fifth consecutive '1' bit to ensure that six consecutive '1' bits—a start frame flag or end frame flag—do not occur and that a reverse process of bit unstuffing is straightforward. For decoding of the encoded data, every time five '1' bits are detected, the following '0' bit is removed from the data. When the following bit is a '1' bit, it is a flag and appropriate processing of the frame occurs.

In serial communication, this results in a transmission of a greater number of bits for a number of input data bits. At the receiving end, the stuffed bits are removed and the number of input data bits is decoded. When transmitting a number of bytes, the method is not problematic because the bytes sent are the bytes received and only during bit stuffing, transmission, and bit unstuffing is the number of data bits effected. For example, a bit stream of sixteen consecutive one bits is encoded as a start frame flag, five consecutive '1' bits, a '0' bit, five consecutive '1' bits, a '0' bit, five consecutive '1' bits, a '0' bit, a '1' bit and an end frame flag. The total frame length is 8+5+1+5+1+5+1+1+8 or 35 bits. The number of bits is not an integral number of bytes—eight bits.

A second common approach to bit stuffing is used in byte level communication such as that used with modems. The method involves bit stuffing in a fixed bit length fashion to provide, for example, error detection. One common scheme is parity. In parity, a bit is added to every predetermined number of bytes. Usually the predetermined number is one. For each byte, a parity is determined and a bit indicating the parity is stuffed. When a bit is stuffed for each byte, this results in an increase in transmitted data of 12.5% —an undesirable amount.

The process of HDLC bit stuffing is designed to operate at substantially low communications speeds in the order of megabits. In order to perform encoding, a simple counter is used. Every one bit increments the counter; every zero bit resets the counter. When the counter reaches 5, a zero bit is stuffed and the counter is reset. Decoding is performed using a similar counter based system. The counter operates at a same speed as the data communications channel. Unfortunately, current communication paradigms are exceeding 25 Mbits per second, some carrying data at data rates over a Giga bit (1000 Mbits) per second. At these speeds, it is difficult to implement at low cost the HDLC bit stuffing circuits currently in use. Essentially, the effects of noise and other effects of high speed circuitry, renders such an HDLC more expensive and more difficult to design.

An encoder decoder for variable length codes is taught by Machado in U.S. Pat. No. 4,675,652 issued Jun. 23, 1987. The encoder encodes data in a fixed ratio of decoded to encoded bits. As such, the encoder decoder is not applicable to HDLC encoding wherein for each 8 bits of data, eight, nine or ten bits result.

In U.S. Pat. No. 5,583,500 in the name of Allen et al. and issued on Dec. 10, 1996, a method of encoding and decoding variable bit length data is presented. The patent discloses a system wherein code words are encoded and decoded in a variable length manner. During encoding, each code word is encoded separately and therefore, parallel encoding of code words is performed. During decoding, code word lengths are known and encoded data is divided into code words and allocated sufficient buffer memory for the decoded code word. The method is for use in video signal transmission.

Unfortunately, in HDLC encoding, a number of encoded bits is determined by bit contents and is not known in advance. Also, encoding of any bit requires knowledge of the previous 4 encoded bits. Because of these limitations, serial encoding of HDLC data is used as described above.

It would be advantageous to provide a means for transmitting HDLC encoded data signals via a packet oriented data network such as a Sonet network.

It would be advantageous to provide a low cost high speed HDLC encoding circuit.

OBJECT OF THE INVENTION

In an attempt to overcome these and other limitations of the prior art, it is an object of the present invention to provide a high speed parallel HDLC encoder and a method of performing HDLC encoding and decoding for high speed digital networks.

SUMMARY OF THE INVENTION

In accordance with the invention there is provided a 1. A method of encoding and decoding data in a digital communication system comprising the steps of:

a) providing a memory buffer for storing one of encoded data and decoded data;

b) receiving a plurality of bits;

c) analysing n consecutive bits from the received bits and k previous output bits for a predetermined sequence of m bits where n is an integer greater than 1, where m is an integer, and where k is an integer greater than or equal to (m−1);

d) transforming the n bits, in dependence upon the analysis, to provide a number of output bits, where the n bits and the k consecutive bits are indicative of the number and content of the output bits;

e) when at least j bits are stored in the memory buffer, providing j bits to a transmitting means;

f) storing some of the output bits in the memory buffer; and, g) repeating steps (b) through (g).

In accordance with the invention there is provided a method of encoding and decoding data in a digital communication system comprising the steps of: providing a plurality of n bit values to a transforming means, where n is an integer greater than 1; in dependence upon the occurrence of predetermined patterns of bits within each f bit value, where f is an integer greater than n and wherein an f bit value is formed by an n bit value and a preceding (f–n) bits, performing in parallel at least one of stuffing bits into and unstuffing bits from said n bit value to provide output bits; storing the output bits; and, when at least a predetermined number of bits is stored, providing bits for one of data transmission and data reception.

BRIEF DESCRIPTION OF THE DRAWINGS

An exemplary embodiment of the invention will now be discussed in conjunction with the attached drawings in which.

DETAILED DESCRIPTION OF THE INVENTION

Sonet networks are high speed optical communications networks carrying packetised data. Often the data packets are 8 bits in length. These fixed length data packets are commonly provided to and received from a Sonet transceiver in parallel. Encoding of this data in parallel has numerous advantages which are evident from the following disclosure.

Throughout the disclosure the terms encoding is used to mean transforming bits for transmission and decoding is used to mean transforming bits that are received. Bit-stuffing is a form of encoding which is a form of transforming data. Bit unstuffing is a form of decoding which is also a form of transforming data.

In transmitting HDLC information using byte oriented transmissions, a variable number of data bits are transmitted with each packet. The number of bits is variable because of bits included within packets using bit-stuffing. The most common approach to bit-stuffing is used in digital data communications having a continuous serial data stream for which HDLC was designed and where addition of data bits has little effect other than upon throughput. As described above, when certain bit patterns occur, additional bits are inserted within or following the pattern.

An embodiment is disclosed herein with reference to a packet size of eight bits—eight bits are received in parallel and eight bits are provided for transmission during each clock cycle. It is evident to those of skill in the art that the method is applicable to packets of other sizes, both larger and smaller.

Figure 1:
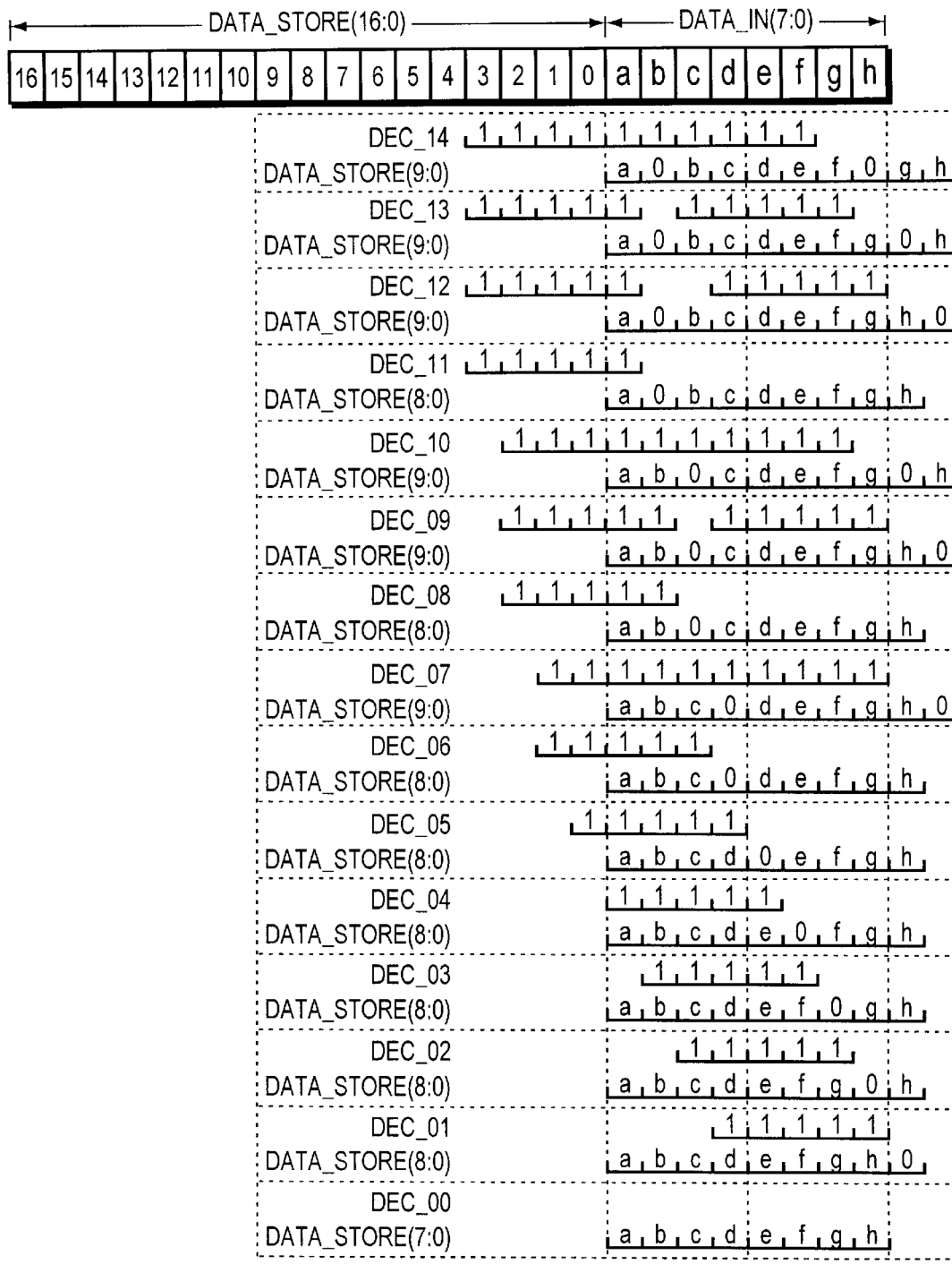
FIG. 1 is a diagram of potential bit sequences for HDLC encoding and associated encoded bit sequences wherein eight bits are encoded simultaneously in dependence upon the eight bits and four previous bits.

Referring to FIG. 1 a diagram of possible bit stuffing patterns is shown. The bits in the table that are being processed—bit—stuffed—are labeled a through h and the bits in a data store awaiting transmission are labeled 16 through 0. In all 17 bits await transmission while 8 bits are processed and up to two extra bits are stuffed. Those data values that are not shown are pseudo don't cares; they are selected such that the data values do not match another data value in the table and thereby result in another five consecutive '1' bit code. For example, referring to DEC_13, the intervening bit, 'b,' must be a '0' bit. Referring to DEC_06, when c, d, e, f, and g are all '1' bits, the resulting data is the same as DEC_07. Therefore, DEC_06 precludes c through e being all '1' bits.

As is evident from the table of FIG. 1, there is a small finite number of bit-stuffing options. This number, 15, is determined in dependence upon the value of the 12 bits 3 . . . 1, and a . . . h. The analysis of the 12 bits is a straightforward operation. Of course, one of the bit-stuffing options results in no bit-stuffing—input data is provided as output data. Once a stuffing pattern is determined, the data in the data store is shifted down (left in the figure) and the stuffed data is stored within the data store. In the data store shown in FIG. 1, the rightmost data bits provide four of the twelve bits necessary for processing the following eight bits. Preferably, the four bits are provided to the data store and recycled to the processing circuit allowing transmission of the four bits during processing of a subsequent byte. Eight bits are transmitted each cycle to remain synchronous with the communication network. When bit stuffing has resulted in an extra eight bits, an extra byte is available for transmission. Data input is suspended for one clock cycle while an additional byte is transmitted. The method then proceeds.

Figure 2:
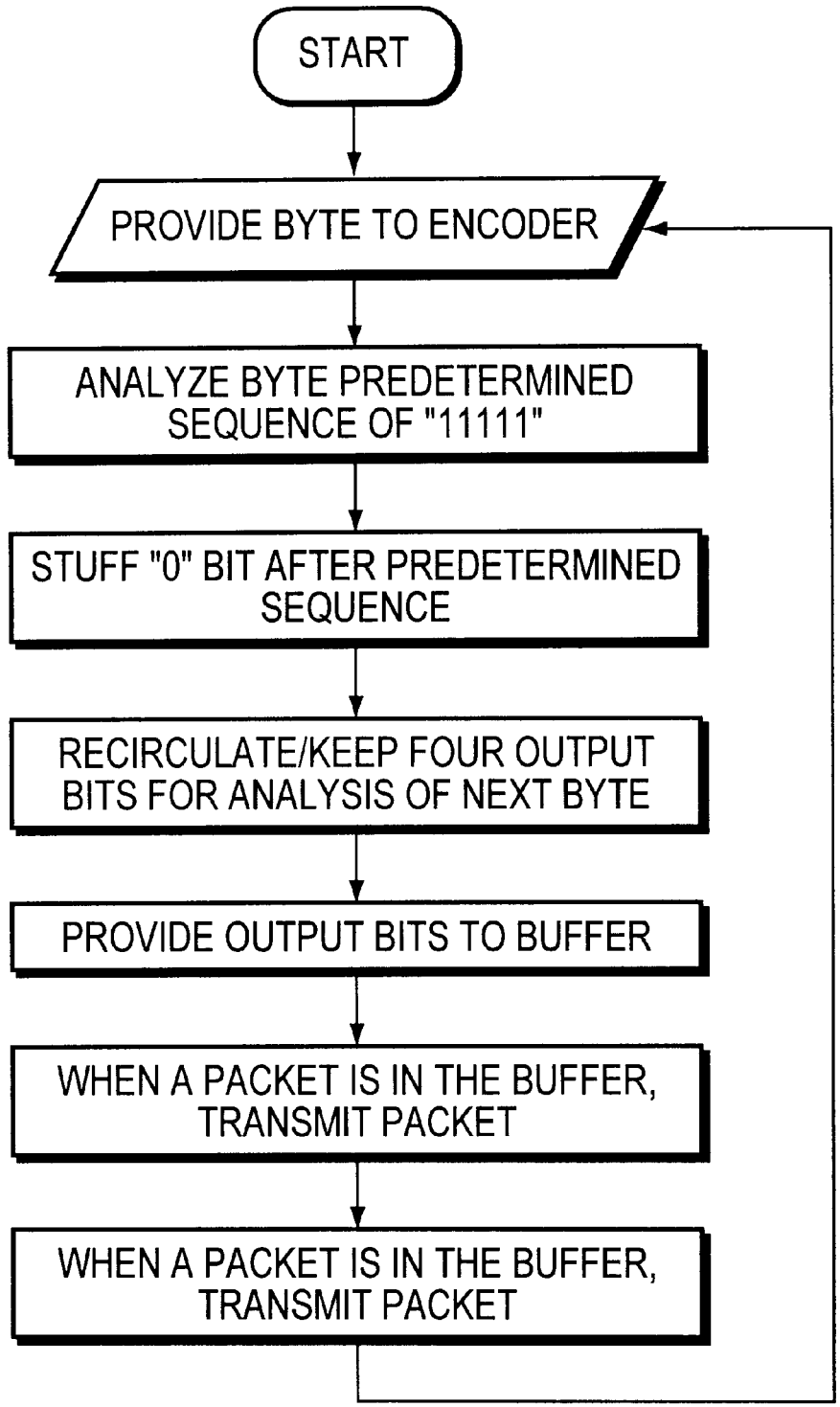
FIG. 2 is a simplified flow diagram of a method of performing HDLC encoding in parallel.

Referring to FIG. 2, a simplified flow diagram of a method of performing HDLC encoding in parallel is shown. A predetermined number of bits in the form of an eight bit byte is provided to an encoder. The encoder processes the bits to determine output bits. eight, nine, or ten bits result from the processing. The output bits comprises the input bits and up to two '0' bits inserted as described above. The processing is performed in parallel using, for example, logic gates. Preferably, output bits are determined in parallel to maximise circuit speed.

Each bit is determined in dependence upon all previous input bits to ensure that, for example, six contiguous '1' bits are not stuffed with two '0' bits. As is evident from FIG. 1, the input bits are determinative of the output bit pattern; each output bit is determined from the input bits only. Alternatively, each output bit is used in determining a next output bit. Once the encoded data is determined, a byte of data is provided from the data store to a transceiver and the output bits—from eight to ten bits—are provided to the data store. Alternatively, when the data store contains two bytes, two bytes are provided to the transceiver and the output bits—from eight to ten bits—are provided to the data store.

TABLE 1

Sample logic to implement bit stuffing bito[a] = biti[a]
zerob = bits[3] ∧ bits[2] ∧ bits[1] ∧ bits[0] ∧ biti[a]

TABLE 1-continued

Sample logic to implement bit stuffing bito[b] = biti[b] ∧ NOT (zerob)
shiftc = zerob
zeroc = NOT(bits[3]) ∧ bits[2] ∧ bits[1] ∧ bits[0] ∧ biti[a] ∧ biti[b]
bito[c] = NOT(zeroc) ∧ ((biti[b] ∧ shiftc) ∨ (biti[c] ∧ NOT(shiftc)))
shiftd=zerob ∨ zeroc
zerod = NOT(bits[2]) ∧ bits[1]∧ bits[0] ∧ biti[a] ∧ biti[b] ∧ biti[c]
bito[d] = NOT(zerod) ∧ ((biti[c] ∧ shiftd) ∨ (biti[d] ∧ NOT(shiftd)))
shifte= zerob ∨ zeroc ∨ zerod
zeroe = NOT(bits[1]) ∧ bits[0]∧ biti[a] ∧ biti[b] ∧ biti[c] ∧ biti[d]
bito[e] = NOT(zeroe) ∧ ((biti[d] ∧ shifte) ∨ (biti[e] ∧ NOT(shifte)))
shiftf= zerob ∨ zeroc ∨ zerod ∨ zeroe
zerof = NOT(bits[0]∧ biti[a] ∧ biti[b] ∧ biti[c] ∧ biti[d] ∧ biti[e]
bito[f] = NOT(zerof) ∧ ((biti[e] ∧ shiftf) ∨ (biti[f] ∧ NOT(shiftf)))
shiftg= zerob ∨ zeroc ∨ zerod ∨ zeroe ∨ zerof
zerog = NOT(biti[a] ∧ biti[b] ∧ biti[c] ∧ biti[d] ∧ biti[e] ∧ biti[f]
bito[g] = NOT(zerog) ∧ ((biti[f] ∧ shiftg) ∨ (biti[g] ∧ NOT(shiftg)))
shifth= zerob ∨ zeroc ∨ zerod ∨ zeroe ∨ zerof ∨ zerog
zeroh = (NOT(biti[b] ∧ biti[c] ∧ biti[d] ∧ biti[e] ∧ biti[f] ∧ biti[g]) ∨ (zerob ∧ biti[b]∧
        biti[c] ∧ biti[d] ∧ biti[e] ∧ biti[f])
bito[h] = NOT(zeroh) ∧ ((biti[g] ∧ shifth) ∨ (biti[h] ∧ NOT(shifth)))
shifti_1 = zerob ∨ zeroc ∨ zerod ∨ zeroe ∨ zerof ∨ zerog ∨ zeroh
shifti_2 = zerob ∧ zeroh
i_exists = zeroi ∨ shifti_1 ∨ shifti_2
zeroi = (NOT(biti[c]) ∧ biti[d] ∧ biti[e] ∧ biti[f] ∧ biti[g] ∧ biti[h]) ∨ (zeroc ∧ biti[c]∧
        biti[d] ∧ biti[e] ∧ biti[f] ∧ biti[g]) ∨ (zerob ∨ NOT(biti[b]) ∧ biti[c] ∧ biti[d]∧
        biti[e] ∧ biti[f] ∧ biti[g])
bito[i] = NOT(zeroi) ∧ ((biti[g] ∧ (shifti_2) ∨ (biti[h] ∧ (NOT(shifti_2) ∧ shifti_1))))
shiftj_2 = (zerob ∧ (zeroh ∨ zeroi)) ∨ (zeroc ∧ zeroi)
zeroj = (zeroc ∧ NOT(biti[c]) ∧ biti[d] ∧ biti[e] ∧ biti[f] ∧ biti[g] ∧ biti[h]) ∨ (zerob∧
        NOT(biti[c]) ∧ biti[d] ∧ biti[e] ∧ biti[f] ∧ biti[g] ∧ biti[h]) ∨ (zerod ∧ biti[d]∧
        biti[e] ∧ biti[f] ∧ biti[g] ∧ biti[h])
j_exists = zeroj ∨ shiftj_2
bito[j] = NOT(zeroj) ∧ (biti[h] ∧ shiftj_2)

Referring to Table 1 above, the bits are labeled as follows: biti[a..h] are the input bits from a byte for transmission, bits[3..0] are four consecutive bits of previously encoded data, one of which is consecutive with a bit from the byte for transmission, and bito[a..j] are the output bits—the results of the encoding process. Zero# is indicative of a stuffed zero at a particular bit location and shift# is indicative of an input bit being shifted by a stuffed '0' bit or two. The '#' in the zero# and shift# are replaced with a bit location (a..j) in Table 1.

The bits, bits[3..0] are already stuffed so bito[a] is equal to biti[a] every time. When biti[a] is a fifth consecutive '1' bit, bito[b] is a '0'—it is a stuffed bit—as reflected by the value of zerob. All proceeding bits are shifted at least one space—to the right in FIG. 1—so shiftc is based on zerob.

zeroc is based on the five previous bit values—bits[2..0] and biti[a.b] as well as on zerob. When zerob is set, a '0' bit has been stuffed into bito[b] leaving no previous consecutive '1' bits in the encoded bits, therefore, zeroc requires more complicated logic for a determination. As only a limited number of bits are analysed during a cycle, and a finite number of bit patterns exist, the logic shown in Table 1 can be significantly reduced. It has not been reduced or optimised herein to maintain readability. Optimisation of the logic, is a straightforward operation for one of skill in the art.

When either zerob or zeroc is set, bito[d] is shifted—to the right in FIG. 1. This is reflected in shiftd which is based on zerob and zeroc. For each output bit bito[c..h], one of three values results—a '0' bit when bit-stuffing of that bit is performed as indicated by zeroc, zerod, . . . a corresponding biti when no bit stuffing has occurred in a previous bit, and a biti of a preceding bit when a single '0' bit has been stuffed. As is evident from a review of FIG. 1, the first possible output bit after two stuffed '0' bits, is bito[i]. Therefore for bito[i..j], there exists a fourth result—a biti preceding the bito by two when two '0' bits have been stuffed. Of course, bito[i] is only filled when at least a '0' bit has been stuffed and bito[j] is only filled when two '0' bits are stuffed.

As is evident from Table 1, the logic is more complicated as the number of potential results increases, but is easily extrapolated from the table. For example, using 16 bits of data input and 4 bits from the data store, results in up to 20 data output bits comprising up to four stuffed '0' bits. Therefore, the a output bit has a single result, the b output bit has one of two results, the c through h output bits have one of three results, the i through n output bits have one of four outcomes, the o through p output bits have one of five outcomes, the q through t output bits are only used when bit-stuffing has been performed on the data and, therefore, each has fewer possible results than the preceding bit as well as the possibility of not being used.

The method as employed in the flow diagram of FIG. 2 or as implemented using an optimised version of the equations of Table 1, analyses and performs encoding with eight input bits simultaneously and therefore is capable of operating at speeds of approximately eight times those supported by conventional HDLC encoders. Of course, encoding more bits in parallel increases potential data throughput and is limited only by integrated circuit size, and other known design factors.

Figure 3:
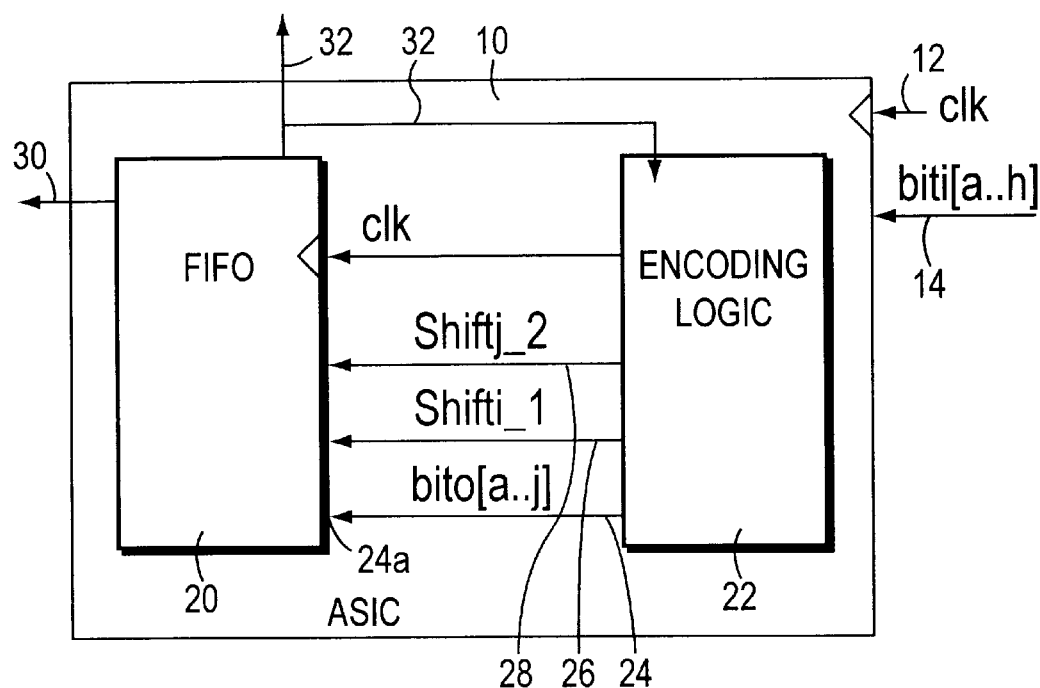
FIG. 3 is a simplified block diagram of an implementation of a device according to the invention using a first-in-first-out memory buffer.

Referring to FIG. 3, a simplified block diagram of a circuit for performing data encoding according to the invention is shown. The circuit comprises an integrated circuit in the form of an ASIC 10. Alternatively, a programmable logic device is used. The ASIC 10 receives a clock signal 12 and eight data input bits 14. Of course, when more data input bits are provided in parallel, the ASIC 10 is designed to receive them. Within the ASIC 10 are two main blocks 22 and 20.

A encoding logic block 22 encodes the input data bits and recirculates the last four bits for a subsequent encoding operation. The output bits 24 are loaded into the FIFO block 20. The FIFO block 20 comprises a first-in-first-out (FIFO) memory with an eight bit parallel output 30 and a variable bit input 24a. The FIFO block 20 is loaded with eight, nine or ten bits. In the diagram of FIG. 3, this is controlled by the logical values shifti_1 26 indicating at least nine bits and shiftj_2 28 indicating ten bits. The bits cascade to a FIFO block output 30 where, during each clock cycle, a byte is provided out of the ASIC 10 for transmission over a Sonet network. A feedback signal 32 from the FIFO block 20 provided to the encoding logic block 22 and to circuitry (not shown) outside the ASIC 10 pauses data input when the FIFO block 20 may overflow. This provides an extra clock cycle for reducing data within the FIFO block 20 without clocking more encoded data into the FIFO block 20.

When clocked the ASIC 10 provides an output byte from the FIFO block output 30 and clocks in an input byte 14. This provides eight free bit spaces within the FIFO block 20 during each clock cycle. Of course, because bit-stuffing is occurring, the eight freed bit spaces are often replaced with nine or ten bits. When overflow is likely, the feedback signal 32 ensures that when clocked, the ASIC 10 provides an output byte and does not clock in an input byte. During decoding, underflow is a potential problem so the feedback signal 32 indicates that no data is being output from the ASIC 10 during a particular clock cycle.

When the encoding block 22 provides bits 24 to the FIFO block 20, the encoding block 22 also latches four bits— farthest to the right in FIG. 1—for use in the subsequent cycle. Alternatively, the four bits are provided to the FIFO block 20 and the FIFO block 20 provides the bit values back to the encoding block 22. When the latter is done, the FIFO block 20 is designed to prevent the output of the last four bits until encoding of a next data byte is complete.

Figure 4A:
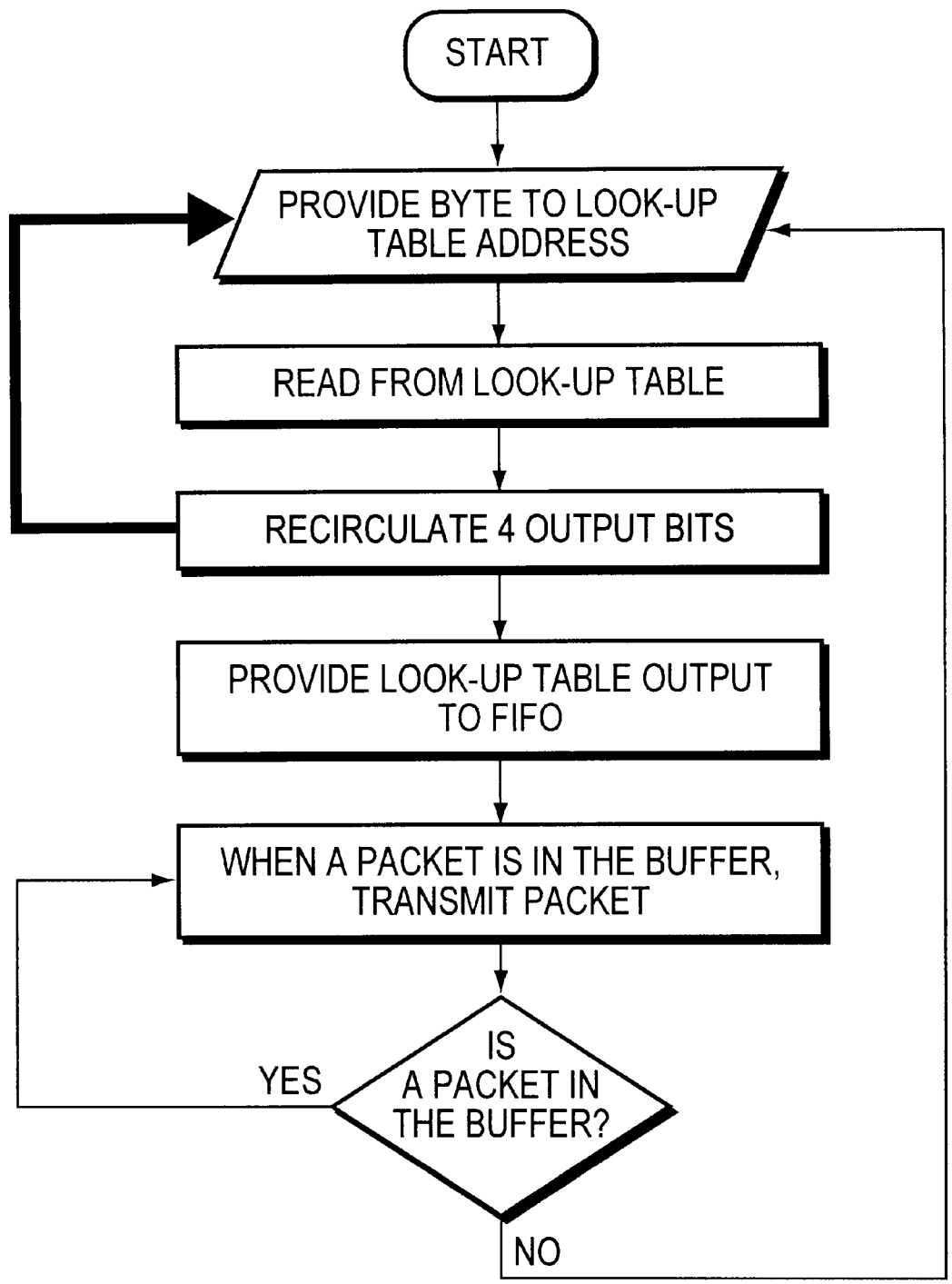
FIG. 4a is a simplified flow diagram of a method of encoding parallel data according to the invention and using a look up table; and, FIG. 4b is a simplified block diagram of an implementation of a device according to the invention using a first-in-first-out memory buffer and a ROM look-up table for encoding/decoding operations.
Figure 4B:
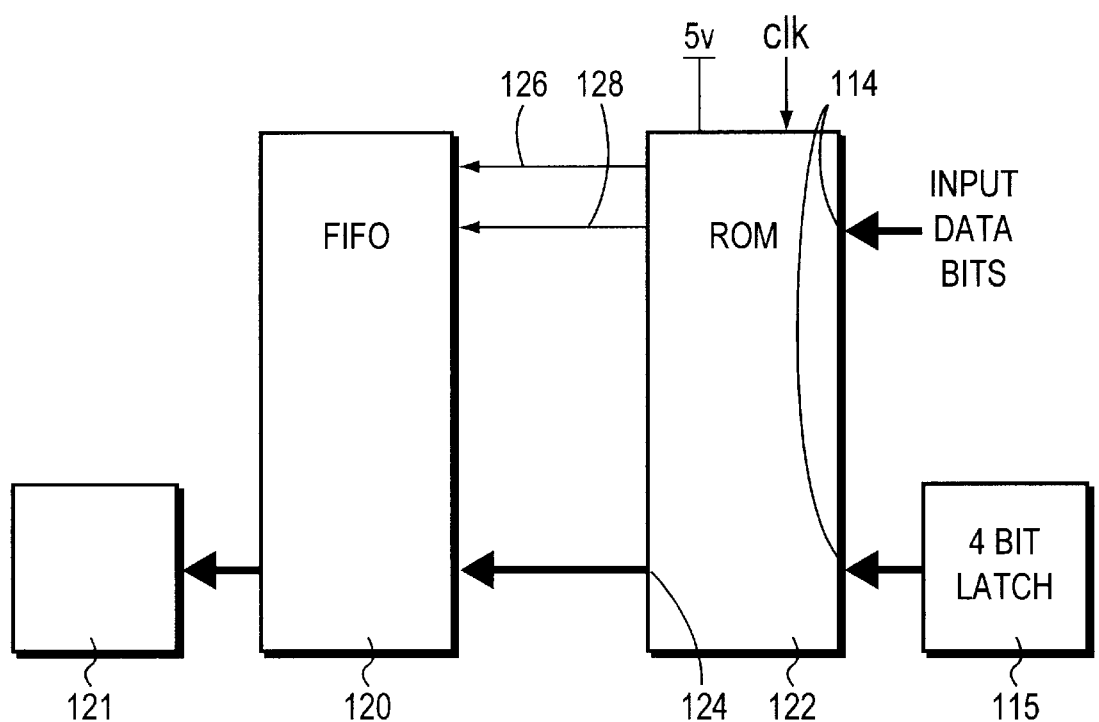

Referring to FIG. 4a, a method of encoding parallel data according to the invention and using a look up table is shown. In 4b, a block diagram for carrying out the method of FIG. 4a is shown. Twelve bits are provided to lookup table 122. The table comprises twelve address line inputs 114 and twelve data line outputs 124. Look up tables of this magnitude are often formed of several ROMs (shown in FIG. 4b as a single ROM). The twelve bit input 114 is provided to the lookup table and an encoded bit pattern is output. Two of the twelve output bits 126 and 128 are flag bits indicating a presence of extra bits in the stuffed bits. When no bits are stuffed, the extra bits are '0' bits. Of course, different polarity may also be used. When bits are stuffed, one or both of the extra bits are set to '1.'

The least significant four bits are recirculated to the ROM input and latched in latch 115 for a subsequent cycle. The eight, nine, or ten bits of an encoded output value are also provided to a FIFO block 120 in the form of a shift register where they are shifted down. When eight bits are in the shift register and the shift register is clocked, the bits are transmitted. When less than eight bits occupy the shift register, the shift register awaits further bits. A quick analysis determines that the shift register will have at most seven bits (less than eight bits) and ten additional bits resulting in a seventeen bit shift register as shown in FIG. 1. Control circuitry 121 is only necessary for determining a number of bits in the shift register and whether eight, nine, or ten bits are being shifted into the shift register. Since both of those are straightforward control tasks, the resulting circuit is simple, efficient, and using an eight bit encoder/decoder (as disclosed) requires substantially ⅛ the clock speed of prior art serial encoders.

It is obvious to those of skill in the art that increasing the size of the lookup table to support 16 bit encoding is possible but is likely to increase costs significantly. Therefore, when larger numbers of bits are encoded in parallel, the method described with respect to Table 1 and FIG. 3 is preferred.

Numerous other embodiments of the invention are envisaged without departing from the spirit or scope of the invention.

What is claimed is:

1. A method of inserting bits (inserted bits) into a data stream to eliminate the occurrence of a flag symbol, comprising:

transferring a word of data into an encoding logic circuit during an initial clock cycle, said encoding logic circuit to insert bits into said word of data in order to eliminate an occurrence of said flag signal;

transferring said word of data plus said inserted bits along a first parallel path into a first in first out buffer (FIFO), said inserted bits inserted as required to eliminate said flag symbol, said first parallel path having a first width greater than a number of bits in said word of data, said first width chosen to accommodate a word of data plus the maximum number of inserted bits to be inserted into said word of data, and transferring to said FIFO at least one number signal indicating a number of inserted bits added to said word of data;

transferring from said FIFO at least one word of data along a second parallel path to further circuitry, said second parallel path having a second width equal to a number of bits in said word of data;

generating a feedback signal, responsive to said number signal, in the event that a subsequent shift of data from said encoding logic to said FIFO may overflow said FIFO, said feedback signal to prevent transferring data along said first parallel path to said FIFO during a next clock cycle, and during said next clock cycle transferring a word of data out of said FIFO along said second parallel path; and, transferring a subsequent word of data plus inserted bits into said FIFO along said first parallel path from said encoding logic during a further clock cycle.

2. The method as in claim 1 further comprising: choosing said word of data as an eight bit byte of data.

3. The method as in claim 1 further comprising:

choosing said word of data as an eight bit byte of data; and choosing said first parallel path as a ten bit wide data path.

4. The method as in claim 1 further comprising: choosing said word of data as a sixteen bit wide word.

5. The method as in claim 1 further comprising:

choosing said word of data as a sixteen bit wide word; and, choosing said first parallel path as a twenty bit wide data path.

6. The method as in claim 1 further comprising:

choosing said inserted bits as "0" bits;

choosing said flag symbol as a sequence of six consecutive "1" bits, and inserting said "0" bits in order to avoid the occurrence of six consecutive "1" bits.

7. The method as in claim 1 further comprising:

choosing said encoding logic circuit as a hardwired logic circuit.

8. The method as in claim 1 further comprising:

choosing said encoding logic circuit as a table look up circuit.

9. Electromagnetic signals transmitted over a data network, comprising: said electromagnetic signals generated according to the method of claim 1.

10. The electromagnetic signals of claim 9, further comprising: said data network is a Sonet data network.

11. An apparatus to insert bits (inserted bits) into a data stream to eliminate the occurrence of a flag symbol, comprising:

means for transferring a word of data into an encoding logic circuit during an initial clock cycle, said encoding logic circuit to insert bits into said word of data in order to eliminate an occurrence of said flag signal;

means for transferring said word of data plus inserted bits along a first parallel path into a first in first out buffer (FIFO), said inserted bits inserted as required to eliminate said flag symbol, said first parallel path having a first width greater than a number of bits in said word of data, said first width chosen to accommodate a word of data plus the maximum number of inserted bits to be inserted into said word of data, and transferring to said FIFO at least one number signal indicating a number of inserted bits added to said word of data;

means for transferring from said FIFO at least one word of data along a second parallel path to further circuitry, said second parallel path having a second width equal to a number of bits in said word of data;

means for generating a feedback signal, responsive to said number signal, in the event that a subsequent shift of data from said encoding logic to said FIFO may overflow said FIFO, said feedback signal to prevent transferring data along said first parallel path to said FIFO during a next clock cycle, and during said next clock cycle transferring a word of data out of said FIFO along said second parallel path; and, transferring a subsequent word of data plus inserted bits into said FIFO along said first parallel path from said encoding logic during a further clock cycle.

12. An apparatus to insert bits (inserted bits) into a data stream to eliminate the occurrence of a flag symbol, comprising:

an encoding logic circuit into which is transferred a word of data during an initial clock cycle, said encoding logic circuit to insert bits into said word of data in order to eliminate an occurrence of said flag signal;

a first parallel path to transfer said word of data plus inserted bits into a first in first out buffer (FIFO), said inserted bits inserted as required to eliminate said flag symbol, said first parallel path having a first width greater than a number of bits in said word of data, said first width chosen to accommodate a word of data plus the maximum number of inserted bits to be inserted into said word of data;

a number signal transferred from said encoding logic to said FIFO, said number signal indicating a number of inserted bits added to said word of data;

a second parallel path to transfer at least one word of data from said FIFO to further circuitry, said second parallel path having a second width equal to a number of bits in said word of data;

a feedback signal generated, responsive to said number signal, in the event that a subsequent shift of data from said encoding logic to said FIFO may overflow said FIFO, said feedback signal to prevent transferring data along said first parallel path to said FIFO during a next clock cycle, and during said next clock cycle transferring a word of data out of said FIFO along said second parallel path, and transferring a subsequent word of data plus inserted bits into said FIFO along said first parallel from said encoding logic during a further clock cycle.

13. A method of removing bits (removed bits) from a data stream to eliminate previous bit stuffing, comprising:

transferring a word of data into an encoding logic circuit during each clock cycle, said encoding logic circuit to remove bits from said word of data to eliminate said previous bit stuffing;

transferring said word of data minus said removed bits along a first parallel path from said encoding logic circuit into a first in first out buffer (FIFO), said removed bits removed as required to eliminate said previous bit stuffing;

transferring along a second data path from said FIFO to further circuitry a word of data during a clock cycle, and not transferring said word of data during said clock cycle in the event that said FIFO does not contain at least one word of data.

14. A method of removing bits (removed bits) from a data stream to eliminate previous bit stuffing, comprising:

means for transferring a word of data into an encoding logic circuit during each clock cycle, said encoding logic circuit to remove bits from said word of data to eliminate said previous bit stulfing;

means for transferring said word of data minus said removed bits along a first parallel path from said encoding logic circuit into a first in first out buffer (FIFO), said removed bits removed as required to eliminate said previous bit stuffing;

means for transferring, along a second data path from said FIFO to further circuitry, a word of data during a clock cycle, and not transferring said word of data during said clock cycle to said further circuitry in the event that said FIFO does not contain at least one word of data.

15. An apparatus to remove bits (removed bits) from a data stream to eliminate previous bit stuffing, comprising:

an encoding logic circuit receiving a word of data during each clock cycle;

a first in first out buffer (FIFO) receiving along a first parallel path a word of data minus removed bits from said encoding logic circuit, said removed bits removed as required to eliminate said previous bit stuffing, and transferring to said FIFO at least one number signal indicating a number of removed bits removed from said word of data, a second parallel path for transferring a word of data out of said FIFO to further circuitry during a clock cycle, and and not transferring a word of data to said further circuitry during said clock cycle in the event that said FIFO contains less than one word of data.

16. A method of inserting bits into a word of data, comprising:

transferring said word of data into an encoding circuit;

inserting at least one bit into said word by said encoding circuit, said word with said inserted at least one bit being wider than said word;

transferring said word with said inserted at least one bit along a first parallel data path into a FIFO buffer, said first parallel data path having a first width sufficient to accommodate said word and said at least one bit;

transferring a word of data out of said FIFO buffer along a second data path, said second data path having a second width to accommodate a word of data, said second width less than said first width, and leaving at least one bit behind in said FIFO buffer;

inserting at least one second bit into a second word, and transferring said second word into said FIFO buffer along said first data path;

transferring a word out of said FIFO buffer along said second data path and leaving in said FIFO buffer at least one bit;

accumulating bits left in said FIFO buffer as words are transferred out along said second data path;

inhibiting a transfer of a next word into said FIFO buffer in the event that at least one word (hereinafter accumulated word) of bits have accumulated within said FIFO buffer as a result of bits being left behind as said words with stuffed bits are transferred into said FIFO buffer and words are transferred out of said FIFO buffer;

transferring said accumulated word out of said FIFO buffer along said second data path, and leaving behind in said FIFO buffer any bits in excess of a word which have accumulated with said accumulated word;

transferring said next word along with any stuffed bits into said FIFO buffer after said accumulated word is transferred out of said FIFO buffer.

17. A method of removing bits from a serial data stream, comprising:

transferring at least a word of bits into a decoding circuit;

removing unwanted bits by said decoding circuit;

transferring remaining bits after removing unwanted bits into a FIFO buffer;

transferring a word of data out of said FIFO buffer along an output parallel data path, said output parallel data path having a width sufficient to accommodate only one word of data, leaving behind any bits in excess of a word which have accumulated within said FIFO buffer, said transferring done in response to at least one word of bits being in said FIFO buffer;

inhibiting transfer of input bits into said FIFO buffer in the event that at least one word of bits have accumulated (hereinafter accumulated bits) in said FIFO buffer from previous steps;

transferring a word of accumulated bits out of said FIFO buffer along said output parallel data path.

18. Electromagnetic signals transmitted over a data network, comprising: said electromagnetic signals generated according to the method of claim 16.

19. Electromagnetic signals transmitted over a data network, comprising: said electromagnetic signals generated according to the method of claim 17.

* * * * *